United States Patent
Kharisov et al.

(10) Patent No.: US 9,311,940 B1
(45) Date of Patent: Apr. 12, 2016

(54) MULTIPLE HEAD CONTROL USING COMMON AND DIFFERENTIAL POSITION ERROR SIGNALS

(71) Applicant: Seagate Technology LLC, Cupertino, CA (US)

(72) Inventors: Evgeny Kharisov, Longmont, CO (US); Kenneth Haapala, Plymouth, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/810,635

(22) Filed: Jul. 28, 2015

(51) Int. Cl.
  *G11B 21/02* (2006.01)
  *G11B 5/596* (2006.01)

(52) U.S. Cl.
  CPC .................................. *G11B 5/59627* (2013.01)

(58) Field of Classification Search
  CPC ............... G11B 27/36; G11B 5/59627; G11B 5/59633; G11B 5/5534; G11B 5/54; G11B 2220/20; G11B 2220/90; G11B 5/012
  USPC ................................ 360/31, 75, 69, 51, 77.04
  See application file for complete search history.

(56) References Cited

U.S. PATENT DOCUMENTS

| | | | |
|---|---|---|---|
| 6,678,108 B2 | 1/2004 | Smith et al. | |
| 7,369,340 B1 | 5/2008 | Dang et al. | |
| 8,094,405 B1 * | 1/2012 | Ying | G11B 5/59627 360/77.04 |

* cited by examiner

*Primary Examiner* — Nabil Hindi
(74) *Attorney, Agent, or Firm* — Hollingsworth Davis, LLC

(57) ABSTRACT

First and second position error signals (PES) are measured from respective first and second read heads that are simultaneously reading two different surfaces of a recording medium. A common repeatable runout (RRO) compensation signal and a differential RRO signal are determined based on the first and second PES. A voice coil motor that drives the first and second read heads is adjusted using the common RRO compensation signal, and first and second microactuators that respectively position the first and second read heads are adjusted based on the differential RRO signal.

20 Claims, 6 Drawing Sheets

MULTIPLE HEAD CONTROL USING COMMON AND DIFFERENTIAL POSITION ERROR SIGNALS

SUMMARY

Various embodiments described herein are generally directed to multiple head control using common and differential position error signals. In one embodiment, first and second position error signals (PES) are measured from respective first and second read heads that are simultaneously reading two different surfaces of a recording medium. A common repeatable runout (RRO) compensation signal and a differential RRO signal are determined based on the first and second PES. A voice coil motor that drives the first and second read heads is adjusted using the common RRO compensation signal, and first and second microactuators that respectively position the first and second read heads are adjusted based on the differential RRO signal.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
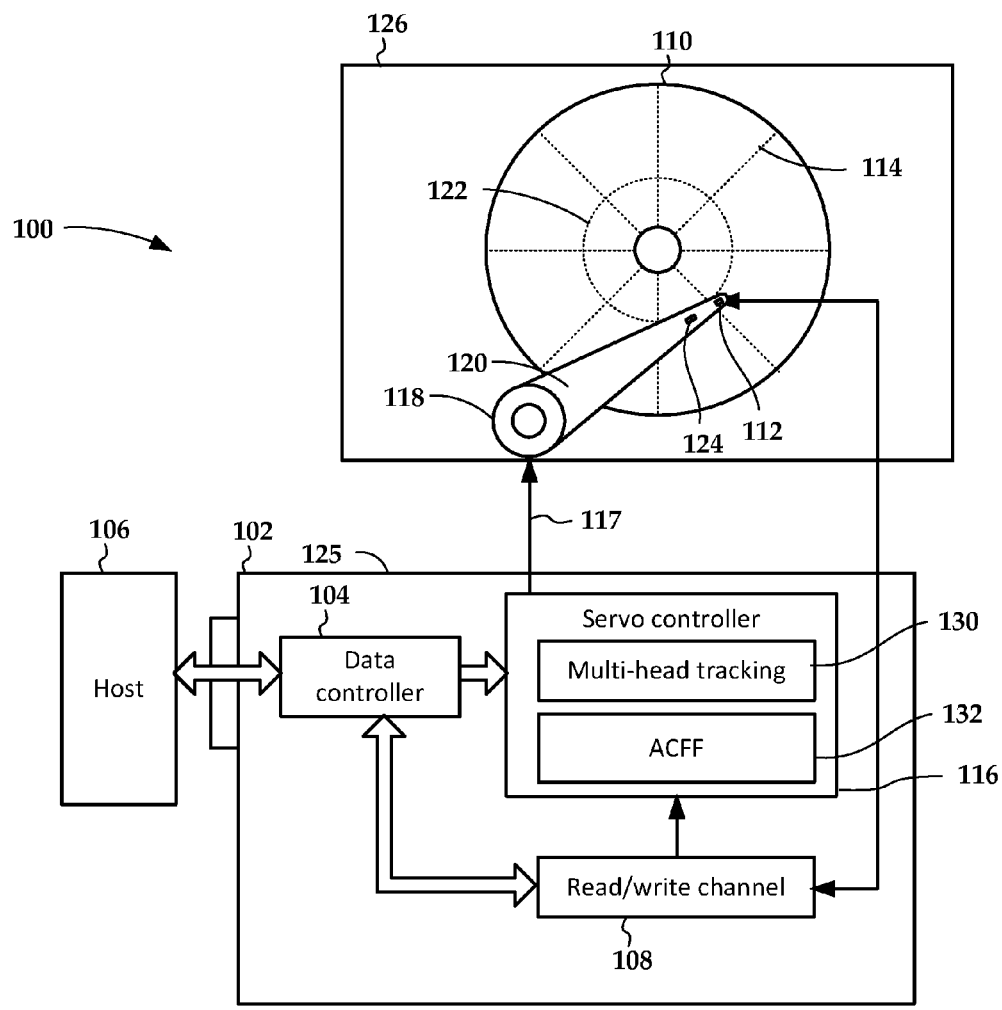
FIG. 1 is a block diagram of an apparatus according to an example embodiment.

Most hard disk drives include two or more read/write heads that are capable of reading data from two or more surfaces of a magnetic disk. For example, if a drive includes a single disk, two read/write heads may read from opposite sides of the disk. This can be extended to more than two disks, e.g., four read/write heads reading from two disks. In such a case, only one of the read/write heads is usually used at a time, e.g., for reading from or writing to one of the disk surfaces. Control is switched from head-to-head depending on which disk surface needs to be accessed to fulfill host requests.

The following disclosure relates to hard disk drives that allow for two or more read/write heads to operate in parallel. This can, for example, increase data throughput by simultaneously reading from and/or writing to two more read/write heads that are located over different surfaces of one or more disks. In other applications, this may be used to improve reliability by writing and/or reading redundant data via each of the heads. The read/write heads will generally be coupled to a common actuation structure, e.g., a multi-arm assembly that is commonly driven by a voice coil motor. A servo system controls the voice coil motor to position the heads. The servo control system may also individually control each of the read/write heads to some extent, via microactuators associated with each read/write head.

There are a number of challenges when trying to track two or more read/write heads over different surfaces at the same time. One of these challenges relates to tracking anomalies that may affect each disk surface differently. Generally, disk drives may be manufactured using discs with servo marks that are pre-written onto the disks before the disks are clamped together on a spindle motor. The servo system reads these marks to determine the location of the read/write head on the disk. The location includes a radial distance from center (e.g., track number) and an angular rotation (e.g., sector number).

The processes of writing servo data and disk assembly can result in repeatable runout (RRO) errors due. Generally, RRO is an offset between the actual location of the servo marks and an ideal spiral around the center of rotation of the assembled disk. The RRO can be caused by centering misalignment of the disks after assembly, distortion caused by clamping forces, as well as undesired motion of the servo pattern writer caused by external and windage disturbances. A servo control system may use different techniques to compensate for RRO. One of the techniques discussed herein utilizes feedforward compensation.

Relative to hard disk servo control, feedforward compensation generally involves injecting/modifying a control signal that affects read/write head position. While feedback control uses a position error signal (PES) as an input to the actuator controller(s), feedforward may use other signals for computing the injection into the control loop after the feedback controller. Both feedback and feedforward can be used together in a servo control system. One algorithm employed to perform RRO compensation is referred to as an alternating current feedforward (ACFF) algorithm. Generally, ACFF involves estimating repeatable runout compensation as a summation of sinusoids at various harmonic frequencies. The harmonic signals are injected into the actuator control signals to compensate for the runout. In order to determine the amplitude and phase of the compensation signal (which may change, e.g., due to environmental conditions), ACFF involves monitoring the PES signal and adapting the parameters of the ACFF appropriately.

In the present disclosure, a servo system is described that can detect and alleviate the RRO for multiple read/write heads that are simultaneously reading or writing to different recording media surfaces (e.g., disk drive surfaces). In FIG. 1, a perspective view that illustrates components of a hard drive apparatus 100 that utilizes a servo controller according to an example embodiment. The apparatus includes circuitry 102 such as a data controller 104 that processes read and write commands and associated data from a host device 106. The host device 106 may include any electronic device that can be communicatively coupled to store and retrieve data from a data storage device, e.g., a computer. The data controller 104 is coupled to a read/write channel 108 that reads from and writes to surfaces of one or more magnetic disks 110.

The read/write channel 108 generally converts data between the digital signals processed by the data controller 104 and the analog signals conducted through two or more read/write heads 112 during read operations. It will be understood that the term "read/write head" used herein may also be applicable, under the appropriate circumstances to read-only heads and/or write-only heads. To facilitate read and write operations, the read/write channel 108 may include analog and digital circuitry such as preamplifiers, filters, decoders, digital-to-analog converters, timing-correction units, etc. The read/write channel 108 also provides servo data read from servo wedges 114 on the magnetic disk 110 to a servo controller 116. The servo controller 116 uses these signals to provide position control signals 117 to a VCM 118. The VCM 118 rotates an arm 120 upon which the read/write heads 112 are mounted in response to the control signals 117. The position control signals 117 may also be sent to microactuators 124 that individually control each of the read/write heads 112, e.g., causing small displacements at each head.

Data within the servo wedges 114 is used to detect the location of a read/write head 112 relative to the magnetic disk 110. The servo controller 116 uses servo data to move read/write heads 112 to an addressed track 122 and block on the magnetic disk 110 in response to the read/write commands (seek mode). While data is being written to and/or read from the disk 110, the servo data is also used to maintain the read/write head 112 aligned with the track 122 (track following mode).

In this example, the read/write channel 108 and the servo controller 116 are configured to utilize two or more of the read/write heads 112 simultaneously, e.g., for simultaneous read and/or write operations from/to different surfaces of the disk(s) 110. In order to accommodate separate positioning of the different read/write heads 112, the servo controller includes a multi-head tracking module 130 that facilitates sending separate, simultaneous control signals 117 to control different read/write heads 112, e.g., via the VCM 118 and different microactuators 124. An ACFF module 132 facilitates determining different RRO components that affect the different read/write heads 112 differently. A more detailed discussion of the operation of the ACFF module 132 (and equivalents thereof) is provided below.

As noted above, ACFF can be used to adaptively compensate for RRO. However, for drives where two or more read/write heads are used simultaneously, two or more PES signals are measured simultaneously, which will most likely contain different RRO content. Because the VCM drives all read/write heads together, a VCM correction signal is unable to compensate for RRO for all heads simultaneously. For this reason, a servo controller according to example embodiments uses a differential ACFF method (DACFF), which uses two or more microactuator correction signals along with VCM correction signal to compensate for the repeatable PES runout for two or more heads simultaneously.

Figure 2:
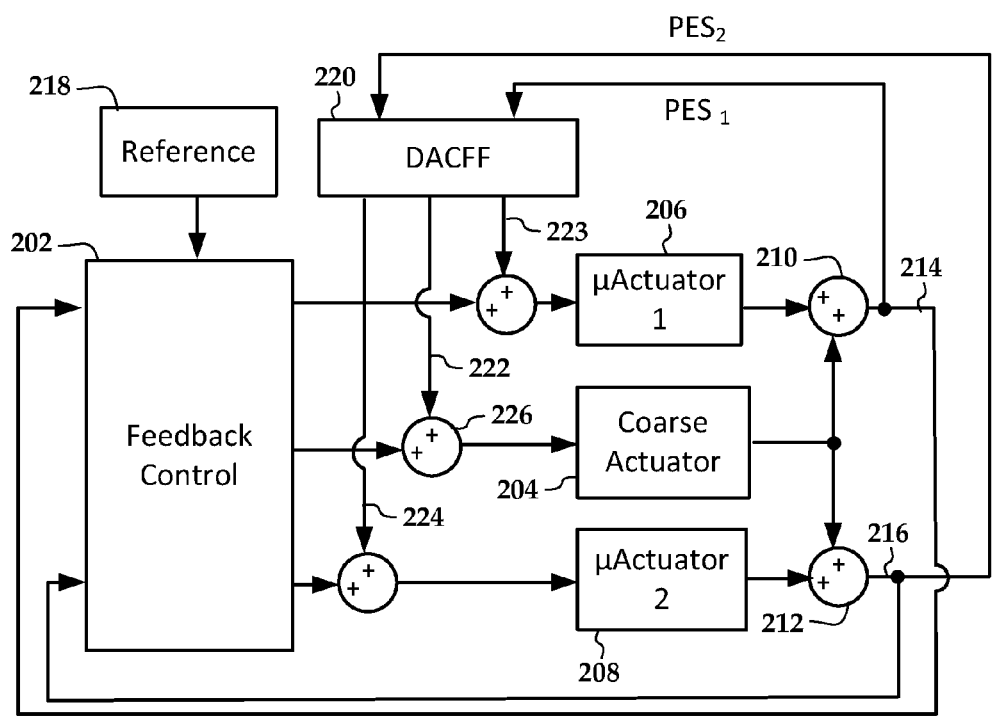
FIG. 2 is a block diagram of a servo control system according to an example embodiment.

In reference now to FIG. 2, a block diagram illustrates a servo control system 200 according to an example embodiment. For the sake of simplicity, the illustrated servo control system controls two read/write heads operated in parallel. As will be described in greater detail further below, this can be extended to control the operation of more than two read/write heads. The figure shows a feedback controller 202 that provides control inputs to a coarse actuator 204 (e.g., VCM) and first and second microactuators 206, 208 (e.g., piezoelectric actuators). The first microactuator 206 and coarse actuator 204 together change the position of a first read/write head, as indicated by summation element 210. The second microactuator 208 and coarse actuator 204 together change the position of a second read/write head, as indicated by summation element 212.

The outputs of summation elements 210, 212 are position signals 214, 216. The position signals 214, 216 are input to the feedback controller 202, where they are compared to a reference position 218. The reference position 218 is provided by a system controller (not shown) that directs the read/read write heads to target locations (e.g., track and sector) on the respective disk surfaces. A comparison between the reference position 218 and the position signals 214, 216 provides the individual PES values of the read/write heads. For purposes of this discussion, the position signals 214, 216 will be considered as equivalent to PES signals, and so are labeled $PES_1$ and $PES_2$ in the figure.

Figure 3:
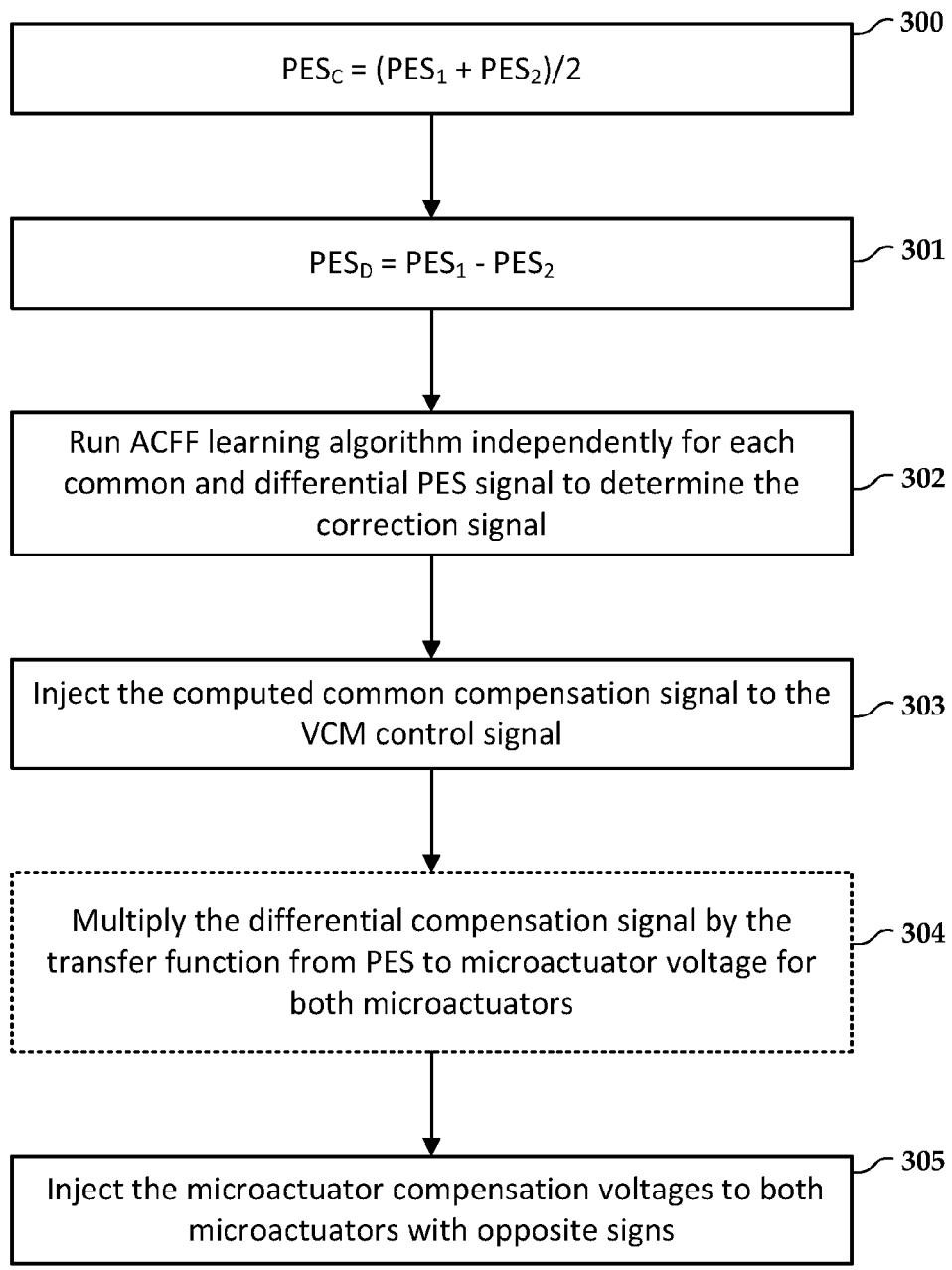
FIG. 3 is a flowchart showing a method according to an example embodiment.

A DACFF module 220 uses $PES_1$ and $PES_2$ signals to generate feedforward signals 222-224 for the coarse actuator 204 and both microactuators 206, 208. Generally, the feedforward signal 222 includes a common runout correction signal that affects both read/write heads equally, and the feedforward signals 223, 224 includes differential runout corrections specific to each read/write head. In FIG. 3, a flowchart illustrates how the feedforward signals 222-224 are calculated according to an example embodiment.

Computation of the correction signals involves computing 300 the common signal $PES_C$ using the indicated sum. The illustrated calculation also shows a division of the sum by two, although this may be optional to reduce computational overhead. In other cases, an operation such as a binary right shift can be used instead of a true division. The differential $PES_D$ is also computed 301 using the indicated difference. As shown in block 302, an ACFF learning algorithm can be run independently for each common mode and differential PES signals to determine the correction signal. Details of this algorithm are described in greater detail below.

At operation 303, the computed common mode compensation signal $PES_C$ is injected into the VCM control signal, e.g., via summation element 226 shown in FIG. 2. At block 304, the differential mode compensation signals can optionally be multiplied by transfer functions from PES to microactuator voltage to obtain the required microactuator compensation voltages. This compensates for differences between the microactuators. The microactuator compensation voltages are then injected (e.g., via summation elements 227, 228 shown in FIG. 2) to both microactuators with opposite signs. The operations shown in FIG. 3 can simultaneously reduce some harmonics of the repeatable runout for both read/write heads. This also facilitates centering of the VCM in between the heads, which leads to optimal stroke utilization. The frequencies of the harmonics may be selected beforehand, e.g., based on a known characteristics of the device, and/or be adaptively determined based on changing operating conditions (e.g., operating temperature)

Figure 4:
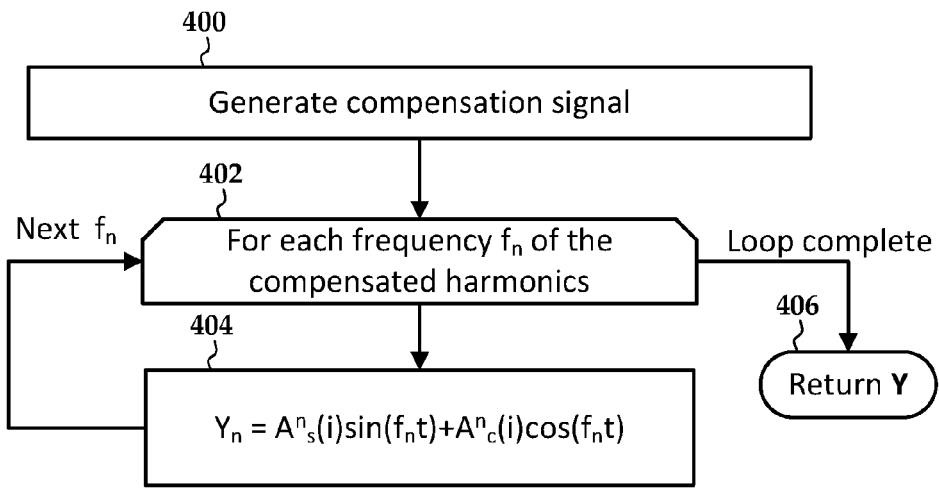
FIG. 4-5 are flowcharts illustrating a feedforward adaptive learning algorithm according to an example embodiment.
Figure 5:
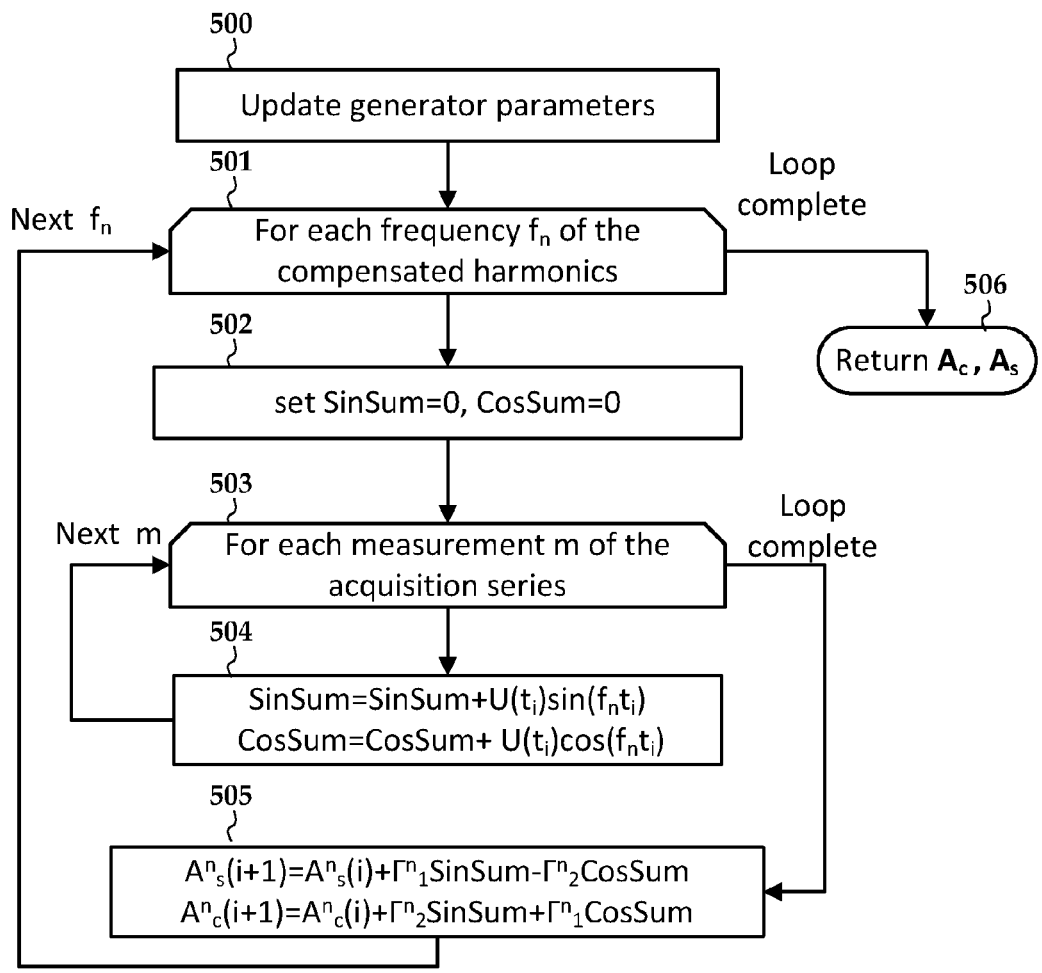

In reference now to FIGS. 4 and 5, flowcharts illustrate an example of how the ACFF learning algorithm can be implemented. Generally, multiple copies of this algorithm can be run for common and differential mode. The algorithm includes two parts: generating the compensation signal as shown in FIG. 4, and updating generator parameters as shown in FIG. 5. Each of the procedures shown in FIGS. 4 and 5 can be performed separately (e.g., in parallel) for the respective VCM and microactuator feedforward signals.

The procedure 400 FIG. 4 is performed for a time step defined within the servo control loop. The loop limit 402 indicates iteration through the frequencies of each of the compensated harmonics. At block 404, the feedforward compensation signal value $Y_n$ for each harmonic at time t is found. Generally, this computation is an inverse discrete Fourier transform (DFT) of the harmonics to obtain the time-varying signals $Y_n$. The variables $A''_s$ and $A''_c$ are respective adaptive sine and cosine coefficients, which are updated as shown in the flowchart of FIG. 5. After all the signal values $Y_n$ are found, a vector Y of the values $Y_n$ is returned at block 406. Alternatively, the values of $Y_n$ can be summed in the loop 402, and the sum returned at block 406.

In FIG. 5, a procedure 500 is shown for updating the sine and cosine coefficients $A''_s$ and $A''_c$, e.g., using a time series of $PES_C$ and $PES_D$ values that derived from collections of previous PES samples from the read/write heads. As indicated by loop 501, the coefficients are found for each compensated harmonic. At block 502, the accumulator values SinSum and CosSum are initialized. Loop limit 503 iterates through each measurement of $PES_C$ and $PES_D$ over the acquisition period. In block 504, the SinSum and CosSum values are accumulated, where U is the input (either $PES_C$ or $PES_D$), and $t_m$ is the time when the sectors associated with the samples were read. When the sums are accumulated, the update of the adaptive coefficients is performed as indicated in block 505. The F coefficients in block 505 are learning gains that can be computed, for example, by using the real and imaginary components of the PES to control an input disturbance transfer function. The procedure returns 506 with two collections of values, one collection of the cosine coefficients for each harmonic, and the other collection of the sine coefficients for each harmonic.

Figure 6:
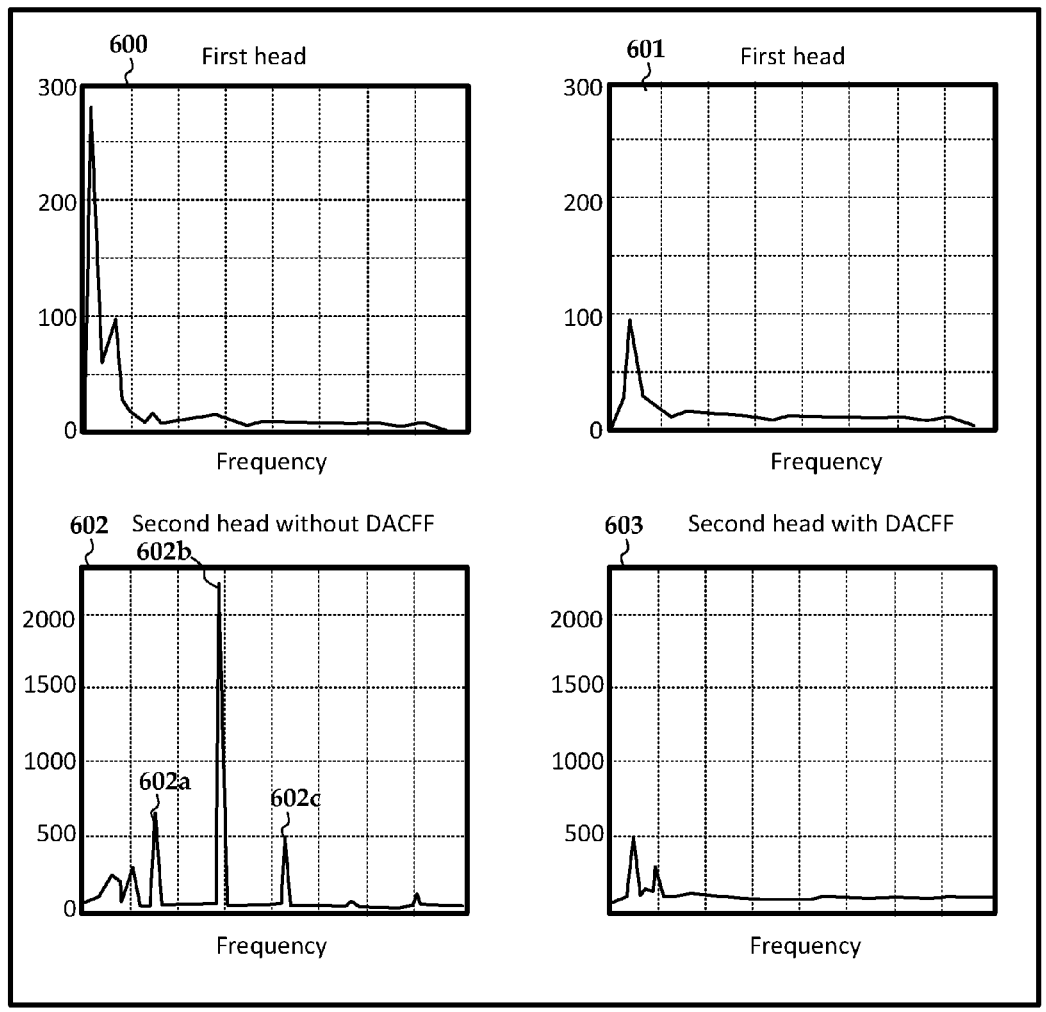
FIG. 6 is a set of graphs comparing results of compensated and uncompensated a dual-head control hard drive according to an example embodiment.

In FIG. 6, a set of graphs 600-603 shows a comparison of a dual-head control hard drive with and without DACFF compensation according to an example embodiment. Without DACFF, a single stage controller (VCM-only) is applied to the first head and the second head is in open loop. Graphs 600 and 601 are PES power spectrum plots for the first head with and without DACFF compensation, respectively. Graphs 602 and 603 are PES power spectrum plots for the second head without and with DACFF compensation, respectively. The frequency scale of plots 600 and 601 is one fourth that of plots 602 and 603. Graph 602 shows significant effect of three harmonics 602a-c of the repeatable runout to the PES signal of the second head. As shown in graph 600, the effect of the repeatable runout to the first head is attenuated by the feedback controller.

In the graphs 602 and 603, the transfer functions from PES to PZT voltage was set equal to one for simplicity. In this case the VCM will not move precisely to the center between the heads but will observe some bias toward one of the heads. This phenomena does not appear to degrade performance of the DACFF. As seen by comparing graphs 602 and 603 as well as 600 to 601, the effect of the written in repeatable runout to both PES signals is eliminated.

As previously noted, the examples presented above using two read/write heads can be extended to more than two read/write heads. In such a case, the common mode runout is computed as shown in Expression (1) below, and the differential mode is calculated as shown in Expression (2). As before, the sum in Expression (1) can be scaled by division or shifting bits as appropriate. Each head can use an adaptive algorithm as shown in FIGS. 4-5 to adaptively determine each individual microactuator compensation voltage.

$$PES_c = \Sum_{i=1}^{n} PES_i \quad (1)$$

$$PES_d^i = PES_c - PES_i \quad (2)$$

In this disclosure a DFT-based learning algorithm is used to update the parameters of the correction signal generator. Other learning algorithms can also be used to achieve the same results. One of the examples would be reference model adaptive methods. A model reference adaptive system (MRAS) uses a closed loop controller with parameters that are updated to change the response of the system to approach the desired response of a reference model.

In other embodiments, processing of the differential correction signal by the inverse microactuator transfer function (see, e.g., block 304 of FIG. 3) could be replaced by running two independent signal generators with shifted phase and different gain. The required phase shift and gain difference is determined from the difference between the transfer functions for both microactuators. In other cases, if the transfer functions from PES to microactuator voltage are similar for all heads, then the modification of the microactuator feedforward base on transfer functions may be optional.

Figure 7:
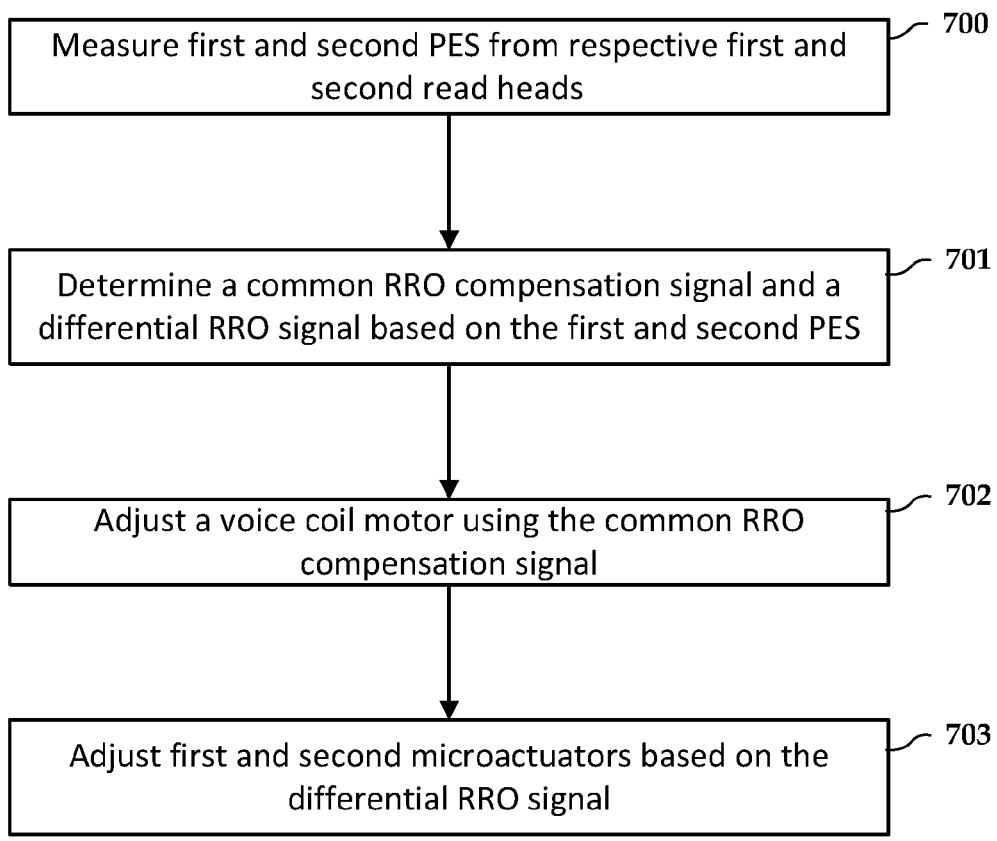
FIG. 7 is a flowchart showing a method according to an example embodiment.

In reference now to FIG. 7, a flowchart illustrates a method for dual-control of read/write heads. First and second PES are measured 700 from respective first and second read heads that are simultaneously reading two different surfaces of a recording medium. A common RRO compensation signal and a differential RRO signal are determined 701 based on the first and second PES. A voice coil motor that drives the first and second read heads is adjusted 702 using the common RRO compensation signal. First and second microactuators that respectively position the first and second read heads are adjusted 703 based on the differential RRO signal.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   measuring first and second position error signals (PES) from respective first and second read heads that are simultaneously reading two different surfaces of a recording medium;
   determining a common repeatable runout (RRO) compensation signal and a differential RRO signal based on the first and second PES;
   adjusting a voice coil motor that drives the first and second read heads using the common RRO compensation signal; and
   adjusting first and second microactuators that respectively position the first and second read heads based on the differential RRO signal.

2. The method of claim 1, wherein adjusting the voice coil motor comprises applying a feed-forward adjustment signal.

3. The method of claim 1, wherein adjusting the first and second microactuators comprise applying first and second feed-forward adjustment signals obtained using the differential RRO signal.

4. The method of claim 3, further comprising multiplying the first and second feed-forward adjustment signals by respective first and second transfer functions to compensate for differences between the first and second microactuators.

5. The method of claim 1, wherein adjusting the voice coil motor and the first and second microactuators comprises utilizing adaptive coefficients for each of a plurality of compensation frequencies.

6. The method of claim 1, wherein adjusting the voice coil motor and the first and second microactuators comprises performing, for each of the voice coil motor and the first and second microactuators:
   performing inverse discrete Fourier transforms (DFTs) for each of a plurality of compensated harmonics; and
   forming a feedforward compensation based on a sum of the inverse DFTs.

7. The method of claim 6, wherein sin and cosine coefficients of the inverse DFTs are adapted based on a set of previously measured PES values.

8. The method of claim 6, wherein the plurality of compensated harmonics are predetermined based on known characteristics of a disk drive that houses the recording medium and the first and second heads.

9. An apparatus comprising:
   a read channel configured to measure first and second position error signals (PES) from respective first and second read heads that are configured to simultaneously read two different surfaces of a recording medium; and
   a servo controller coupled to the read channel and configured to:
      determine a common repeatable runout (RRO) compensation signal and a differential RRO signal based on the first and second PES;
      adjust a voice coil motor that drives the first and second read heads using the common RRO compensation signal; and
      adjust first and second microactuators that respectively position the first and second read heads based on the differential RRO signal.

10. The apparatus of claim 9, wherein adjusting the voice coil motor comprises applying a feedforward adjustment signal.

11. The apparatus of claim 9, wherein adjusting the first and second microactuators comprise applying first and second feedforward signals obtained using the differential RRO signal.

12. The apparatus of claim 11, wherein the servo controller is further configured to multiply the first and second feedforward signals by respective first and second transfer functions to compensate for differences between the first and second microactuators.

13. The apparatus of claim 9, wherein adjusting the voice coil motor and the first and second microactuators comprises utilizing adaptive coefficients for each of a plurality of compensation frequencies.

14. The apparatus of claim 9, wherein adjusting the voice coil motor and the first and second microactuators comprises performing, for each of the voice coil motor and the first and second microactuators:
   performing inverse discrete Fourier transforms (DFTs) for each of a plurality of compensated harmonics; and
   forming a feedforward compensation based on a sum of the inverse DFTs.

15. The apparatus of claim 14, wherein sin and cosine coefficients of the inverse DFTs are adapted based on a set of previously measured PES values.

16. The apparatus of claim 14, wherein the plurality of compensated harmonics are predetermined based on known characteristics of a disk drive that houses the recording medium and the first and second heads.

17. A method comprising:
   measuring first and second position error signals (PES) from respective first and second read heads that are simultaneously reading two different surfaces of a recording medium;
   adjusting a voice coil motor that drives the both first and second read heads using a first feedforward signal that comprises a sum of the first and second PES signals; and
   adjusting first and second microactuators that respectively position the first and second read heads based on second and third feedforward signals that comprise a difference between the first and second PES signals, the second and third feedforward signals having opposite signs.

18. The method of claim 17, further comprising multiplying the second and third feedforward signals by respective first and second transfer functions to compensate for differences between the first and second microactuators.

19. The method of claim 17, wherein the first feedforward signal is formed using inverse discrete Fourier transforms (DFTs) for each of a plurality of compensated harmonics, coefficients of the inverse DFTs adapted based on the sum of the first and second PES signals.

20. The method of claim 17, wherein the second and third feedforward signals are formed using inverse discrete Fourier transforms (DFTs) for each of a plurality of compensated harmonics, coefficients of the inverse DFTs adapted based on the difference of the first and second PES signals.

* * * * *